United States Patent [19]

Mathieu

[11] Patent Number: 4,507,952
[45] Date of Patent: Apr. 2, 1985

[54] APPARATUS FOR TESTING FLOW METERS

[75] Inventor: Jean-Paul Mathieu, Longueuil, Canada

[73] Assignee: ICG Gasbec Inc., Ville Ste-Catherine, Canada

[21] Appl. No.: 418,058

[22] Filed: Sep. 14, 1982

[51] Int. Cl.³ .............................................. G01F 25/00
[52] U.S. Cl. ........................................................ 73/3
[58] Field of Search ..................................... 73/3, 232

[56] References Cited

U.S. PATENT DOCUMENTS

| | | |
|---|---|---|
| 1,234,505 | 7/1917 | Stillman . |
| 2,356,845 | 8/1944 | Hines .................. 73/863.12 |
| 2,792,705 | 5/1957 | Barrett, Jr. . |
| 3,270,549 | 9/1966 | Martin ....................... 73/3 |
| 3,273,375 | 9/1966 | Howe ........................ 73/3 |
| 3,457,768 | 7/1969 | Jasek ......................... 73/3 |
| 3,673,851 | 7/1972 | Wright ....................... 73/3 |
| 3,933,027 | 1/1976 | Mehall . |
| 4,152,922 | 5/1979 | Francisco, Jr. . |
| 4,372,147 | 2/1983 | Waugh ....................... 73/3 |

FOREIGN PATENT DOCUMENTS 1936989  2/1971  Fed. Rep. of Germany ............ 73/3

OTHER PUBLICATIONS

Furness et al., Design Engineering, Jul. 1979, pp. 29, 32 and 35.

*Primary Examiner*—S. Clement Swisher
*Attorney, Agent, or Firm*—Swabey, Mitchell, Houle, Marcoux, & Sher

[57] ABSTRACT

A proving system is described wherein there is a cylinder and a moving piston within the cylinder having an indicator rod extending out of the cylinder and a cursor on the rod adapted to move relative to a scale. A jacket surrounds the cylinder to which liquid propane will be circulated in order to equalize the temperature of the prover system prior to proving a meter to be proved. Once the temperature of the prover has been equalized the temperature of the liquid propane by continuously circulating the liquid propane through the jacket, the circulation to the jacket will be shut off and test runs of the liquid propane through the meter can be initiated.

2 Claims, 5 Drawing Figures

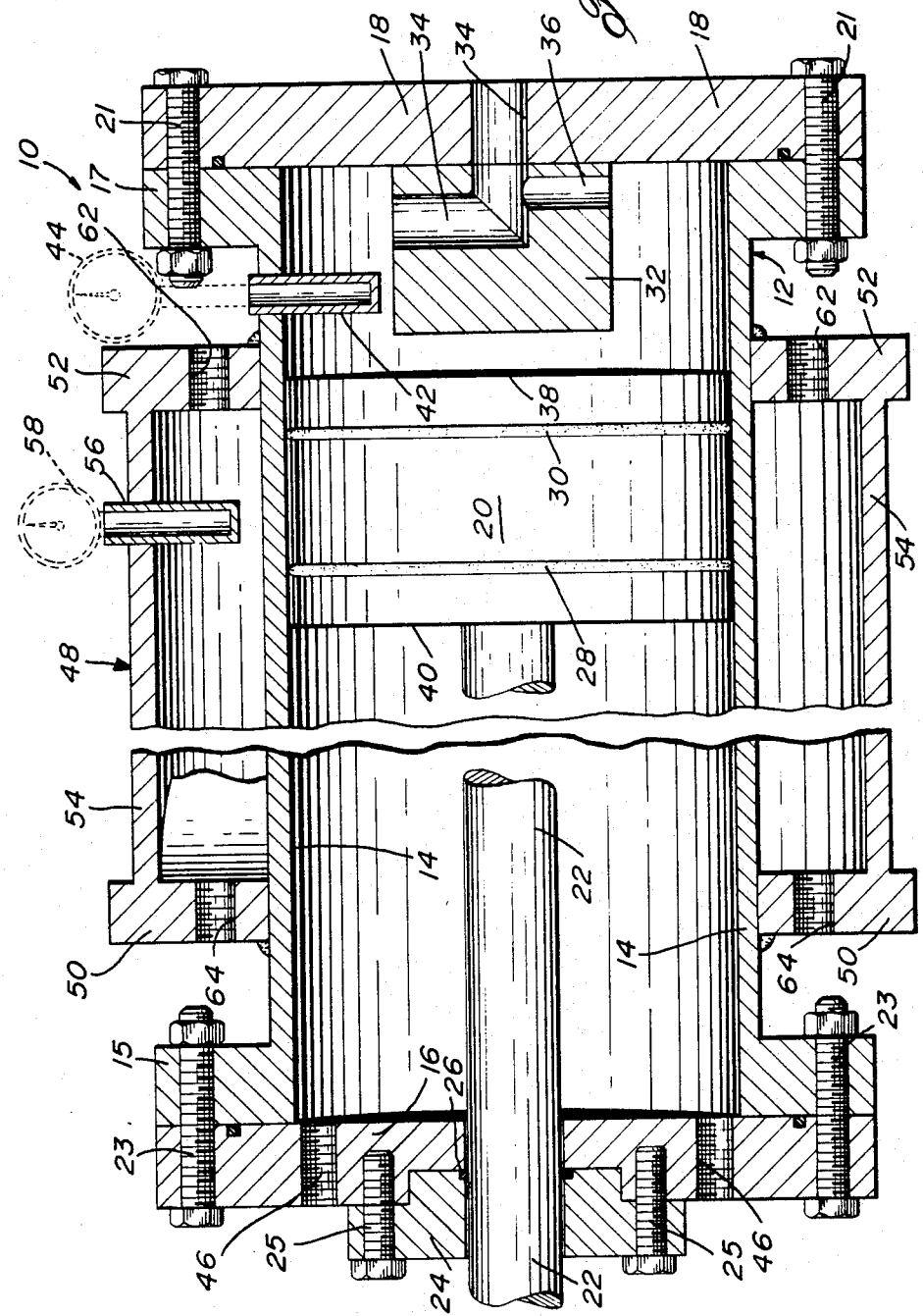

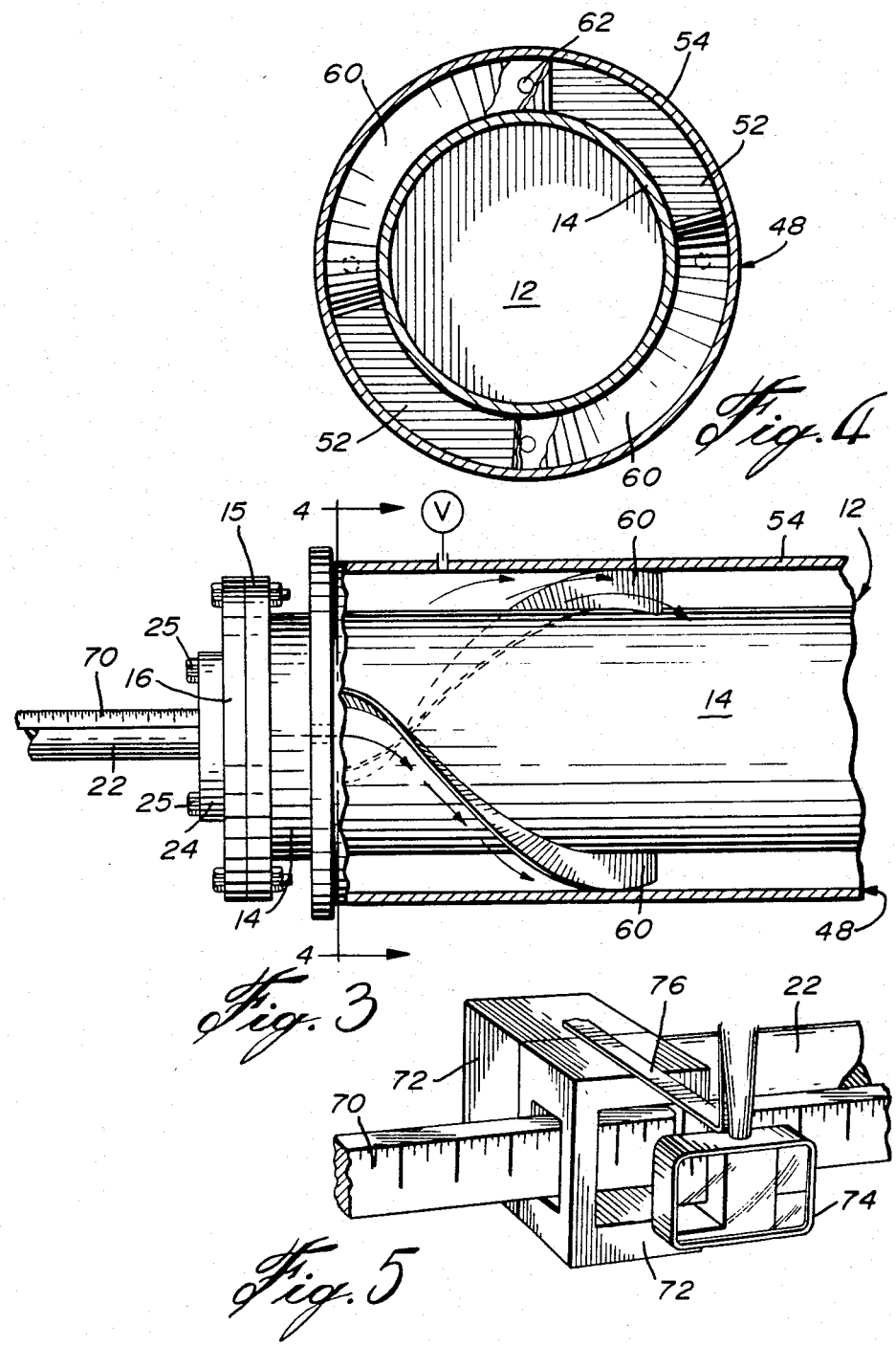

APPARATUS FOR TESTING FLOW METERS

BACKGROUND OF THE INVENTION

1. Field of the Invention

The present invention relates to an apparatus for testing flow meters, particularly of the type utilized in measuring liquids having high vapor pressure such as liquid propane.

2. Description of the Prior Art

Provers and calibrators for testing commercial flow meters must have exceptional accuracy in order to be accepted by government authorities. Further, a substance, such as propane $C_3H_8$, has a boiling point at atmospheric pressure of −45° C. Thus, under normal operating temperatures, propane is in a gaseous state.

With the increase in the price of petroleum products in general and refined gasoline in particular, many alternative fuels for internal combustion engines have been considered. Propane gas is an advantageous alternative in the light of its lower cost and the fact that it does not pollute the atmosphere. However, to be practical, it must be stored and transported in liquid form, thereby requiring pressurized equipment. This means that the handling of the gas from storage to pump to automobile or truck reservoir, must be under pressure controlled conditions.

The flow meters provided on the pumps or other delivery system, must also be calibrated or proven under operating conditions utilizing liquid propane.

Thus, in proving or calibrating such flow meters, environmental conditions such as pressure and temperature, must be kept constant, and leakage must be rigidly controlled.

U.S. Pat. No. 2,792,705 illustrates a prover for volatile or high vapor pressure liquids, such as liquid propane. The prover includes a cylindrical chamber, with a free piston travelling within the cylinder. A suitable valve is provided for passing the liquid propane through one end or the other. A meter to be tested is hooked up to the prover and a predetermined volume of liquid propane as determined by the volume of the cylinder on either side of the piston and several passes of the liquid propane "charge" will determine the accuracy of the meter. Prior to proving a meter, the piston is subjected to several reversals in order that all elements of the proving apparatus are full of liquids and free of vapors and that temperature equalization has been established.

U.S. Pat. No. 4,152,922 includes a measuring piston in a measuring cylinder with an auxiliary piston travelling in an auxiliary cylinder for controlling and retracting the measuring piston.

SUMMARY OF THE INVENTION

It is an aim of the present invention to provide an improved calibrator or prover of the type described with a simplified construction and greater ease in operation.

It is a further aim of the present invention to provide a system whereby the temperature equalization can be easily established.

It is of critical importance that the temperature of the system be equalized. If different temperatures exist in various parts of the prover, then it is impossible to arrive at accurate calibrations no matter how structurally superior the prover may appear to be. As an example, correction factors have been standardized for the proving of liquid propane depending on temperature variations. For instance, if the prover and the gas is at 60° F., the correction factor will be 1.00. However, if the temperature falls to 55° F., then the temperature correction factor which must be applied to the prover results is 1.008. Likewise, if the temperature increase is to 75° F., the correction factor will be 0.995. If, on the other hand, different parts of the prover have unequal temperatures ie. within a range of 10° or 15° F. during a test run, it is obvious that no accurate correction factor could be applied to the results of the prover. To be absolutely accurate, and to apply the proper correction factor, the temperature must be equal throughout the prover.

It is also an aim of the present invention to provide a prover which can be utilized with relatively small quantities of liquid, such as high vapor pressure liquids.

A construction in accordance with the present invention comprises a measuring cylinder and a measuring piston travelling in the cylinder, first port means at one end of the cylinder, second port means at the other end of the cylinder, an indicator rod fixed to the piston and extending axially of the cylinder through one of the ends thereof, a calibrated scale fixed to the end through which the rod passes and being parallel to the rod, a jacket surrounding said cylinder, an inlet port and an outlet port communicating with said jacket, means for alternately communicating a meter to be proved in series with said cylinder ports, means for passing a liquid for proving the meter, firstly through the jacket for equalizing the temperature of the elements of the prover, and then through the meter to be proved and first port of the cylinder on one side of the piston, thus advancing the piston a distance in the cylinder and for comparing the indicated calibration on the scale and the reading on the meter, and means for passing a charge of said liquid through said second port and allowing the first charge to discharge from the first port.

A method is also contemplated by the present invention in which the steps for proving a flow meter would include first coupling the flow meter to be tested to a flow circuit containing a reservoir with a liquid under pressure, pumping said liquid through said meter to be tested at a pressure higher than the pressure in the reservoir, passing the pumped liquid through a thermal jacket surrounding the prover station so as to equalize the temperature of the prover station with the temperature of the pump liquid; once the temperature has been equalized, eliminating the flow through the jacket and passing the pumped liquid through the flow meter to be tested and into one end of a prover station thus forcing a piston in the station to be displaced, reading the amount of displacement of the piston on a gauge external of the proving station and to reversing the flow of the pumped liquid for a second test run through the meter and then to the other end of the prover station so as to return the piston to its original position and taking a second reading on the gauge to determine the displacement of the piston in the second test.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2 is an enlarged fragmentary axial cross-section of the prover shown in FIG. 1;

FIG. 3 is a fragmentary side elevation of the prover with a portion thereof in axial cross-section;

FIG. 4 is a vertical cross-section taken along line 4—4 in FIG. 3; and

FIG. 5 is an enlarged perspective view of a detail of the prover.

DESCRIPTION OF THE PREFERRED EMBODIMENTS

Figure 1:
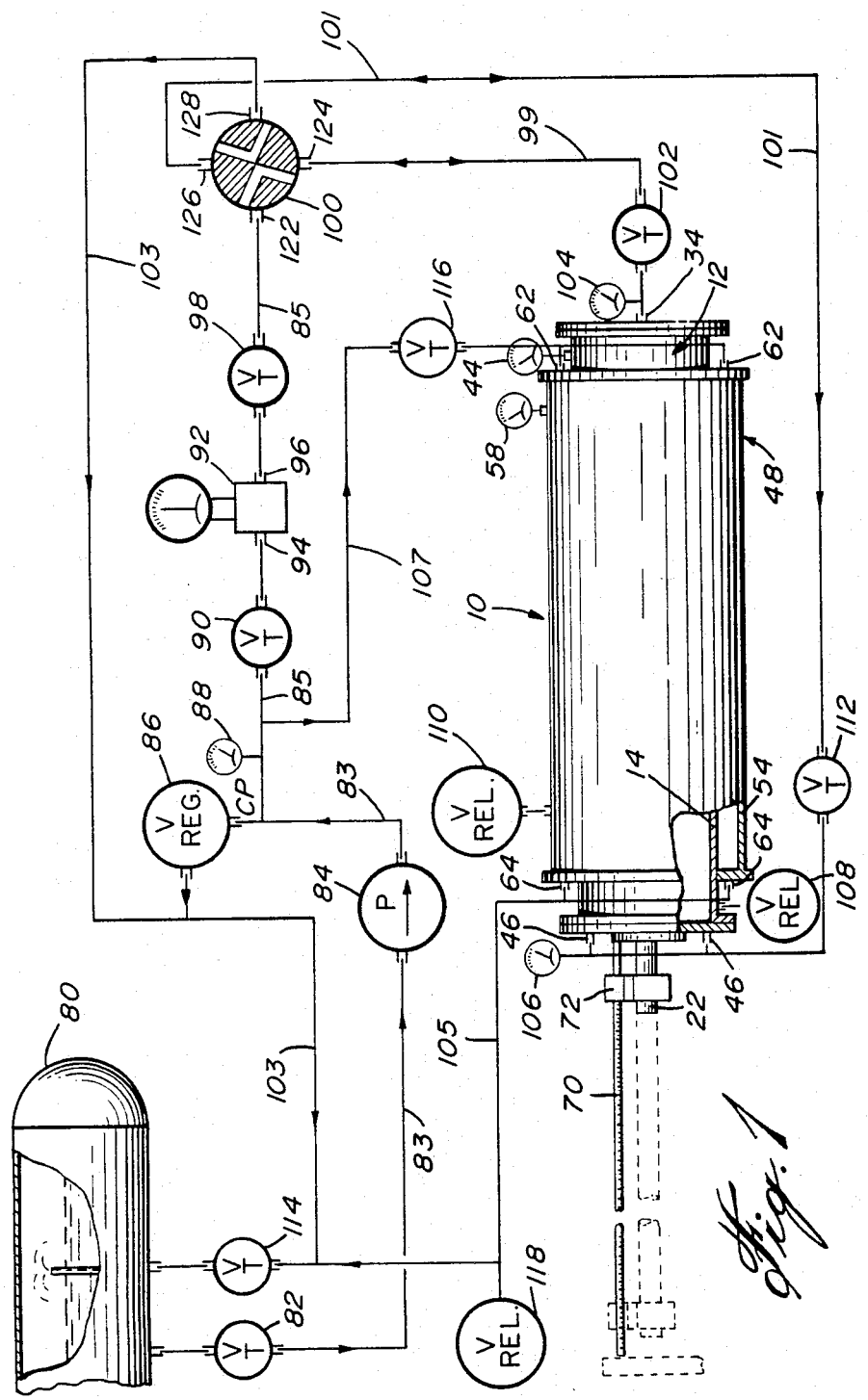
FIG. 1 is a side elevation of the prover in accordance with the present invention and showing by way of a schematic diagram the circuit associated with the prover in normal operation.

Referring now to the drawings illustrating an embodiment of the invention and particularly to FIGS. 1 and 2, there is shown a prover 10 having an elongated hollow cylindrical body 12. The body 12 includes a cylindrical wall 14 terminating in flanges 15 and 17. An end plate 18 is bolted to the flat end 17 by means of nut and bolt arrangements 21 while an end plate 16 is mounted to the flanges 15 by means of the nuts and bolts 23.

A piston 20 travels in the cylinder and an indicator rod 22 is fixed to the piston 20 and extends outwardly through one end of the cylinder and in the present case through the end plate or end wall 16. In order to ensure proper sealing of the chamber formed by the cylinder, proper packing elements 26 are held against the wall 16 and the sliding indicator rod 22 by means of a plate 24 which is bolted to the end plate 16 by means of machine bolts 25. The piston 20 must not allow any leakage thereacross and in the present embodiment is provided with two O-rings 28 and 30. A preferred form of a ring is a quadrant type O-ring.

At one end of the cylinder, a block 32 is provided through which the port 34 is defined. As illustrated in FIG. 2, other distributing ports can communicate with the port 34 such as the port 36. The block 32 prevents the piston 20 from hitting the thermometer well 42.

The piston 20 has opposed faces 38 and 40 which define separate chambers. A thermometer well 42 is provided in the wall 14 of the cylinder and is adapted to receive a thermometer 44. Ports 46 are provided in the end wall 16.

A annular jacket 48 surrounds the cylinder 12 as shown in FIGS. 1 and 2. The annular jacket 48 is illustrated in FIGS. 2, 3 and 4. The jacket includes a cylindrical wall 54 in which is provided a thermometer well 56 adapted to receive a thermometer 58. The jacket also has end walls 50 and 52 which are integral with the cylindrical wall 54. Diverting baffles 60 may be provided in the jacket in order to allow a helical type of circulation of the liquid passing therethrough. The jacket 48 includes ports 62 and 64 which allow circulation of the liquid within the jacket 48.

Mounted to the wall 16 of the cylinder 12, as shown in FIGS. 1 and 3 is a scale 70 which has graduated calibrations corresponding to the variable volume of the chambers formed within the cylinder depending on the actual position of the piston 20. A cursor 72 is mounted on the end of the rod 22 and includes micrometer type graduation adapted to match with the graduations on the scale 70. A magnifying glass 74 may be supported on the cursor 72 by means of a support 76.

Referring now to FIG. 1, there is shown a reservoir 80 which is capable of containing 5000 US gallons of liquid propane. A line 83 which may be any suitable tubing, extends from the reservoir through a throttle valve 82 adapted to control the flow of liquid from the reservoir 80 to the system. The line 83 extends to a pump 84 mounted in series and adapted to increase the pressure of the liquid propane, above the pressure of the liquid propane in the reservoir 80.

A constant pressure bypass valve 86 is provided in series on line 83 with the pump and will allow any pressure above a predetermined level to be relieved by exhausting liquid into the return line to the reservoir 80. In the case of the present embodiment, it has been found preferable to include a pressure differential between the reservoir pressure and the post-pump pressure of 55 pounds per square inch. Accordingly, any pressure in the liquid above 55 pounds per square inch will be by-passed or exhausted back into the return line 103 and only a pressure of liquid equivalent to a differential of 55 pounds per square inch will advance through the meter-to-be-tested 92 pass a pressure gauge 88. A meter-to-be-tested 92 will be coupled in line 85 between the throttle valves 90 and 98. Of course, when it is required to test the meter 92, the throttle valves 90 and 98 will be opened.

The line 85 from the meter 92 is connected with a four way valve 100 which in a suitable position will allow the flow from line 85 through line 99 by valve 102 prior to entering the cylinder 12 by means of the port 34. Around the four way valve 100, there are four ports which can be alternately communicated. A first port 122 with the meter 92 while port 124 is connected to line 99. In an alternate position, the four way valve 100 allows flow from line 85 through port 126, line 101 through valve 112 and into the other end of the cylinder by means of ports 46. A pressure gauge 106 is provided at the connection of the line 101 with the port 46. Port 128 communicates with the return line 103.

Excess relief valve 108 is provided in the cylinder 12 while a similar hydrostatic relief valve 110 is provided on the jacket 48 and a relief valve 118 is on line 105 from port 64. Line 107 to the jacket 48 is connected to line 85 between the pressure gauge 88 and the throttle valve 90. The return of the liquid from the jacket 48 is through the port 64 on the line 105 through throttle valve 114 into the reservoir and pass the pressure relief valve 118.

The liquid propane in the reservoir 80 may be maintained at approximately 100 pounds per square inch when the temperature is 65° F. If it is required to test a meter 92, either to calibrate the meter or to prove it, it will be coupled by means of couplings 94 and 96 on line 85. With the valves 90 and 98 closed, the liquid propane will be pumped by means of pump 84 when valve 82 is open to line 83 and 107 through to the jacket 48 with valve 116 open. The liquid propane will circulate through the jacket 48 and out the port 64 through the line 105 leading to valve 114 which of course will be open allowing the liquid to return through the reservoir 80. The liquid propane will be circulated through the jacket 48 until the temperature of the prover part as represented on the gauge 44 will be the same as the temperature of the liquid propane as shown on the gauge 58 as the liquid passes through the jacket 48. It is very important to ensure temperature equalization of the parts of the prover as described previously in this application since the operator must know at what temperature the system is so as to apply the proper correction factor in interpreting the readings on the gauge 70. If there is a differential in the temperature between the various parts in this system, then it will be impossible to apply an accurate correction factor.

Once the temperature equalization has been reached, the valve 116 is closed and valves 90 and 98 open allowing the liquid propane to pass through the meter to be proved 92 and through the four way valve 100. In one run, the valve 100 will communicate the line 85 through line 99 to the valve 102 thereby allowing the liquid to enter through port 34 of the cylinder 12. Of course, the valve 114 remains open and a pressure level will exist in the line 101 as the four way valve 100 will communicate the return line 103 through ports 128. This allows liquid propane to be present in the cylinder 12 between the surface or piston wall 40 and the end wall 16. However, the liquid propane entering the port 34 at the beginning of a run, will be at a higher pressure differential than the liquid propane on the other side of the piston as the liquid coming in the port 34 is being pumped to a pressure differential of 55 pounds per square inch above the reservoir pressure, thus there is a pressure differential across the piston of 55 pounds per square inch as indicated on gauge 86. The presence of the liquid propane on the other side of the piston, that is between the wall 16 and the surface 40, will provide proper buffer against the piston 20 and thereby prevent flashing of the liquid propane as it enters through the port 34.

In a first run, the piston 20 will travel from right to left in FIG. 2 and the cursor 72 will correspondingly move along the scale 70 as it is displaced by the indicator rod 22. The run may be stopped at any particular moment by closing the respective valve 102, 90 and 98 and a reading may be taken on this scale 70 and after consulting the temperature on gauges 44 and 58, the proper correction factor may be applied to that ending. Of course, the piston 20 may be allowed to travel its full run to the other end of the cylinder adjacent the wall 16, thereby accommodating roughly 24 liters for a run.

In order to pass the second run, the four way valve 100 will be rotated such that the line 85 and port 122 communicates with the port 126 and line 101. Thus, the pumped liquid will pass through the meter-to-be-tested 92 through the line 101 into the cylinder by means of the port 46. Thus, the higher pressure of liquid will be on the side of the pistons between the face 40 and the wall 16. The liquid propane between the face 38 of the piston and the wall 18 will now be in communication through its port 34 and line 99 with the return line 103, by means of ports 124 and 128, and thus into the reservoir 80. Therefore, the pressure in the space between the piston face 38 and the wall 18 will be at approximately 100 pounds per square inch and the pressure of the liquid now entering on the other side of the piston will be at approximately 155 pounds per square inch, displacing the piston from left to right. Once the sufficient amount of liquid is passed through the meter 92 to displace the piston 20, a reading is taken on the scale 70 by means of a cursor 72 and these readings are compared with the indication on the meter 92. As many runs as is desired may be made simply by alternately reversing the valve 100.

I claim:

1. An apparatus for proving a flow meter comprising a measuring cylinder and a measuring piston traveling in the cylinder, first port means at one end of the cylinder, second port means at the other end of the cylinder, an indicator rod fixed to the piston and extending axially of the cylinder and through one end thereof, a calibrated scale fixed to said one of end ends of the cylinder and extending parallel and adjacent the path of the indicator rod, a jacket surrounding said cylinder, an inlet port and an outlet port communicating with said jacket, means for alternately communicating a meter to be proved in series with said cylinder ports, means for passing a liquid under pressure for proving the meter, firstly through the jacket for equalizing the temperature of the elements of the prover and then through the meter to be proved and one of the ports in the cylinder on one side of the piston, thus displacing the piston a distance in the cylinder for comparing the indicated calibration on the scale and the reading on the meter, wherein second valve means are provided for selectively circulating the liquid after the pressure has been increased through said jacket, and port means are provided on the jacket communicating with a line returning directly to a reservoir.

2. A method for proving a flow meter which comprises first coupling the flow meter to be tested to a flow circuit containing a reservoir with a liquid under pressure, pumping said liquid through said meter to be tested at a pressure higher than the pressure in the reservoir, passing the pumped liquid through a thermal jacket surrounding the prover station so as to equalize the temperature of the prover station with the temperature of the pump liquid; once the temperature has been equalized, eliminating the flow through the jacket and passing the pumped liquid through the flow meter to be tested and into one end of a prover station thus forcing a piston in the station to be displaced, reading the amount of displacement of the piston on a gauge external of the proving station and to reversing the flow of the pumped liquid for a second test run through the meter and then to the other end of the prover station so as to return the piston to its original position and taking a second reading on the gauge to determine the displacement of the piston in the second test.

* * * * *